(12) United States Patent
Cheng et al.

(10) Patent No.: US 11,758,087 B2
(45) Date of Patent: Sep. 12, 2023

(54) MULTIMEDIA CONFERENCE DATA PROCESSING METHOD AND APPARATUS, AND ELECTRONIC DEVICE

(71) Applicant: BEIJING BYTEDANCE NETWORK TECHNOLOGY CO., LTD., Beijing (CN)

(72) Inventors: Bin Cheng, Beijing (CN); Mao Li, Beijing (CN); Jingsheng Yang, Beijing (CN); Yuze Gao, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/891,012

(22) Filed: Aug. 18, 2022

(65) Prior Publication Data

US 2022/0394209 A1    Dec. 8, 2022

Related U.S. Application Data

(63) Continuation of application No. PCT/CN2021/077014, filed on Feb. 20, 2021.

(30) Foreign Application Priority Data

Feb. 24, 2020    (CN) .......................... 202010114477.8

(51) Int. Cl.
*H04N 5/775* (2006.01)
*G06F 16/41* (2019.01)

(52) U.S. Cl.
CPC ............. *H04N 5/775* (2013.01); *G06F 16/41* (2019.01)

(58) Field of Classification Search
CPC ...... G06F 16/41; G06F 16/9535; G06F 1/163; G06F 3/00; G06F 3/0486; G06F 3/04886;
(Continued)

(56) References Cited

U.S. PATENT DOCUMENTS 6,816,904 B1 * 11/2004 Ludwig ................. H04M 3/567
709/204
8,675,853 B1 * 3/2014 Guilfoyle ............ H04M 3/2281
379/202.01
(Continued)

FOREIGN PATENT DOCUMENTS

CN    103475835 A    12/2013
CN    105208318 A    12/2015
(Continued)

OTHER PUBLICATIONS

International Patent Application No. PCT/CN2021/077014; Int'l Written Opinion and Search Report; dated May 8, 2021; 9 pages.
(Continued)

*Primary Examiner* — Gerald Gauthier
(74) *Attorney, Agent, or Firm* — BakerHostetler

(57) ABSTRACT

Provided are a data processing method for a multimedia conference, a data processing apparatus for a multimedia conference, and an electronic device. The method includes: receiving a multimedia data stream sent by a conference participant user of the multimedia conference; generating, according to a received recording instruction for the multimedia conference, storage data of the multimedia conference based on the multimedia data stream sent by the conference participant user; and storing the storage data in cloud.

19 Claims, 3 Drawing Sheets

(58) Field of Classification Search
CPC ..... H04L 65/60; H04L 51/10; H04L 65/1073; H04L 65/403; H04M 1/7243; H04M 3/2281; H04M 3/567; H04N 5/775; H04N 7/15; H04N 21/226; H04N 21/23418; H04N 7/147; H04N 7/155; H04N 21/2341; H04N 21/4788; H04N 21/6473; G06T 11/60; G10L 15/26
See application file for complete search history.

(56) References Cited

U.S. PATENT DOCUMENTS

| | | | | |
|---|---|---|---|---|
| 8,717,404 | B2* | 5/2014 | Goyal | G10L 15/26 375/240.03 |
| 8,789,094 | B1* | 7/2014 | Singh | H04N 21/4788 725/62 |
| 8,848,025 | B2* | 9/2014 | Talukder | H04L 65/403 348/E7.083 |
| 9,955,119 | B2* | 4/2018 | Leske | H04N 7/155 |
| 10,462,615 | B2* | 10/2019 | Lee | H04M 1/7243 |
| 2005/0099492 | A1* | 5/2005 | Orr | H04N 7/147 348/E7.083 |
| 2005/0144284 | A1* | 6/2005 | Ludwig | H04N 7/147 348/E7.081 |
| 2011/0268418 | A1 | 11/2011 | Jones et al. | |
| 2012/0030682 | A1* | 2/2012 | Shaffer | H04N 21/23418 718/103 |
| 2012/0062688 | A1* | 3/2012 | Shen | G06F 3/04886 348/E7.083 |
| 2012/0198335 | A1* | 8/2012 | Huang | G06F 16/9535 715/716 |
| 2014/0111597 | A1* | 4/2014 | Anderson | H04L 65/1073 348/14.03 |
| 2014/0139609 | A1* | 5/2014 | Lu | G06T 11/60 348/14.03 |
| 2014/0168350 | A1* | 6/2014 | Rambo | G06F 3/0486 348/14.03 |
| 2014/0340465 | A1* | 11/2014 | Shi | G06F 3/00 348/14.03 |
| 2015/0103131 | A1* | 4/2015 | Denoue | H04N 7/15 348/14.03 |
| 2015/0127782 | A1* | 5/2015 | Qin | H04L 65/60 709/219 |
| 2016/0006983 | A1* | 1/2016 | Mäkelä | G06F 1/163 348/14.03 |
| 2016/0086605 | A1* | 3/2016 | Kim | H04N 7/15 348/14.03 |
| 2016/0198208 | A1* | 7/2016 | Gao | H04N 21/226 725/116 |
| 2018/0293906 | A1* | 10/2018 | Chen | H04N 21/47217 |
| 2019/0281254 | A1 | 9/2019 | Baldwin | |
| 2019/0297371 | A1* | 9/2019 | Subramaniam Natarajan | H04N 21/64738 |
| 2022/0394209 | A1* | 12/2022 | Cheng | G06F 16/41 |

FOREIGN PATENT DOCUMENTS

| | | |
|---|---|---|
| CN | 105450975 A | 3/2016 |
| CN | 105554431 A | 5/2016 |
| CN | 106231100 A | 12/2016 |
| CN | 110049273 A | 7/2019 |
| CN | 110049274 A | 7/2019 |
| CN | 106294539 B | 8/2019 |
| CN | 110166725 A | 8/2019 |
| CN | 110536100 A | 12/2019 |
| CN | 112312057 A | 2/2021 |
| GB | 2549536 A | 10/2017 |

OTHER PUBLICATIONS

"How to use zoom for meeting record"; https://www.zoomvip.cn/product_news/view-225.html; Zoom; Dec. 2018; accessed Sep. 8, 2021; 20 pages.

* cited by examiner

MULTIMEDIA CONFERENCE DATA PROCESSING METHOD AND APPARATUS, AND ELECTRONIC DEVICE

CROSS REFERENCE TO RELATED APPLICATION

The present application is a continuation of International Patent Application No. PCT/CN2021/077014, filed on Feb. 20, 2021, which claims priority to Chinese Patent Application No. 202010114477.8, titled "MULTIMEDIA CONFERENCE DATA PROCESSING METHOD AND APPARATUS, AND ELECTRONIC DEVICE", filed on Feb. 24, 2020, both of which are incorporated herein by reference in their entireties.

TECHNICAL FIELD

The present disclosure relates to the field of internet technologies, and in particular, to a data processing method for a multimedia conference, a data processing apparatus for a multimedia conference, and an electronic device.

BACKGROUND

In order to meet requirements of members from different places to hold meetings, various multimedia conference applications have emerged. It is not difficult to understand that the multimedia conference application may be an application that supports members from different places to hold conferences. In the multimedia conference application, the members participating in the conference may express their opinions.

The multimedia conference is real-time. After the multimedia conference ends, a user may have a requirement of reviewing content of the multimedia conference.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

Embodiments of the present disclosure provide a data processing method for a multimedia conference, a data processing apparatus for a multimedia conference, and an electronic device, to record the multimedia conference under a premise of saving storage resources of a terminal device.

In a first aspect, a data processing method for a multimedia conference is provided according to an embodiment of the present disclosure. The method includes: receiving a multimedia data stream sent by a conference participant user of the multimedia conference; generating, according to a received recording instruction for the multimedia conference, storage data of the multimedia conference based on the multimedia data stream sent by the conference participant user; and storing the storage data in cloud.

In a second aspect, a data processing apparatus for a multimedia conference is provided according to an embodiment of the present disclosure. The device includes: a receiving unit configured to receive a multimedia data stream sent by a conference participant user of the multimedia conference; a generating unit configured to generate, according to a received recording instruction for the multimedia conference, storage data of the multimedia conference based on the multimedia data stream sent by the conference participant user; and a storing unit configured to store the storage data in cloud.

In a third aspect, an electronic device is provided according to an embodiment of the present disclosure. The electronic device includes one or more processors and a storage apparatus storing one or more programs. The one or more programs, when executed by the one or more processors, cause the one or more processors to perform the data processing method for a multimedia conference described in the above first aspect.

In a fourth aspect, a computer-readable medium is provided according to an embodiment of the present disclosure. The computer-readable medium stores a computer program. The computer program, when executed by a processor, causes the processor to perform the data processing method for a multimedia conference described in the above first aspect.

According to the data processing method for a multimedia conference, the data processing apparatus for a multimedia conference, and the electronic device provided by embodiments of the present disclosure, a multimedia data stream sent by a conference participant user of the multimedia conference is received firstly, then storage data of the multimedia conference is generated according to a received recording instruction for the multimedia conference and based on the multimedia data stream sent by the conference participant user, and finally the storage data is stored in cloud. In this way, the storage data is generated based on the multimedia data stream of the multimedia conference, and the storage data is stored in cloud, so that the user can access the storage data at any time, which provides convenience for the user to review the content of the multimedia conference. In addition, the storage resources of the terminal device can be saved. In addition, loss of the above-mentioned storage data caused by damage of the terminal device can also be avoided.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF THE EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
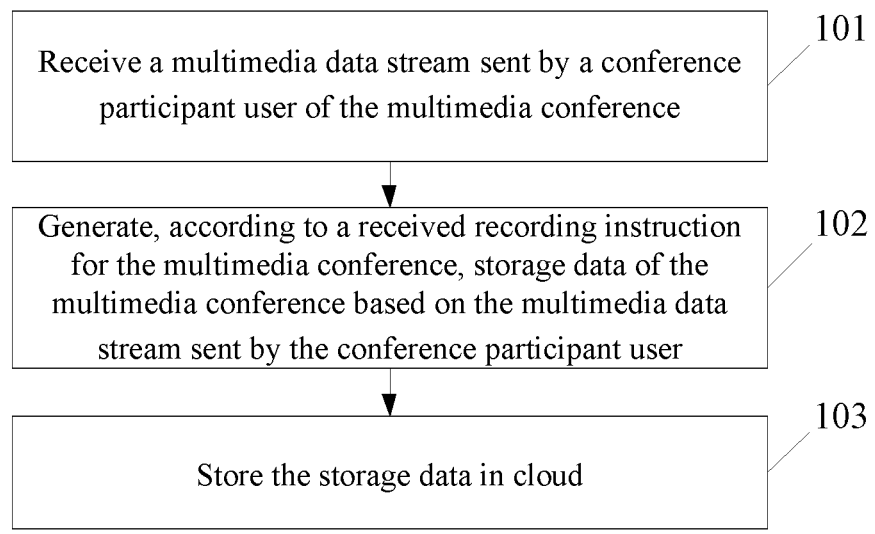
FIG. 1 is a flowchart of a data processing method for a multimedia conference according to an embodiment of the present disclosure.

Reference is made to FIG. 1, which is a flowchart of a data processing method for a multimedia conference according to an embodiment of the present disclosure. As shown in FIG. 1, the method includes steps 101 to 103.

Step 101, receive a multimedia data stream sent by a conference participant user of the multimedia conference.

In this embodiment, the electronic device executing the data processing method for a multimedia conference may receive the multimedia data stream sent by the conference participant user of the multimedia conference.

The above-mentioned multimedia conference may be an audio conference or a video conference.

The above-mentioned multimedia data stream may include at least one of an audio stream and a video stream.

Step 102, generate, according to a received recording instruction for the multimedia conference, storage data of the multimedia conference based on the multimedia data stream sent by the conference participant user.

In this embodiment, the electronic device executing the data processing method for a multimedia conference may receive a recording instruction for the multimedia conference.

The above recording instruction may be an instruction instructing to start or suspend recording of the multimedia conference.

In this embodiment, after receiving the recording instruction for the multimedia conference, the electronic device executing the data processing method for a multimedia conference may generate the storage data of the multimedia conference according to the recording instruction and based on the multimedia data stream sent by the conference participant user.

The above-mentioned storage data may be data obtained by recording the multimedia conference, and may include a multimedia data stream obtained by recording a multimedia data stream sent by the conference participant user.

In some scenarios, if the above recording instruction instructs to start recording of the multimedia conference, the electronic device executing the data processing method for a multimedia conference may start to record the multimedia conference. If the above recording instruction instructs to suspend recording of the multimedia conference, the electronic device executing the data processing method for a multimedia conference may suspend the recording of the multimedia conference.

Step 103, store the storage data in cloud.

In this embodiment, after the storage data of the multimedia conference is generated, the electronic device executing the data processing method for a multimedia conference may store the storage data in cloud.

According to the data processing method for a multimedia conference provided by embodiments of the present disclosure, a multimedia data stream sent by a conference participant user of the multimedia conference is received firstly, then storage data of the multimedia conference is generated according to a received recording instruction for the multimedia conference and based on the multimedia data stream sent by the conference participant user, and finally the storage data is stored in cloud. In this way, the storage data is generated based on the multimedia data stream of the multimedia conference, and the storage data is stored in cloud, so that the user can access the storage data at any time, which provides convenience for the user to review the content of the multimedia conference. In addition, the storage resources of the terminal device can be saved. In addition, loss of the above-mentioned storage data caused by damage of the terminal device can also be avoided.

In some optional implementations, the above-mentioned data processing method for a multimedia conference may be performed by a multimedia conference client. The above recording instruction may be sent by the multimedia conference client. In these optional implementations, the multimedia conference client may receive a preset operation for instructing to record the multimedia conference; and send a recording instruction for the multimedia conference to a multimedia conference server based on the preset operation, so that the server performs following data processing operations: generating storage data of the multimedia conference according to the received recording instruction and based on a multimedia data stream sent by a conference participant user; and storing the storage data in cloud.

The above-mentioned multimedia conference client may be a client of a preset user with an authority of initiating the recording instruction.

Furthermore, the above preset operation is performed in response to receiving a recording request sent by a conference participant user.

The above-mentioned conference participant user may be a conference participant user without the authority of initiating the recording instruction in the multimedia conference. The above-mentioned conference participant user may send a recording request to the above-mentioned preset user with the authority of initiating the recording instruction through the multimedia conference client used by the conference participant user. The preset user with the authority of initiating the recording instruction may perform the above preset operation based on the recording request.

As an illustrative description, after receiving the recording request, a client of the preset user with the authority of initiating the recording instruction may display prompt information for prompting the receipt of the recording request. The above-mentioned prompt information may include an approval option for indicating agreement of recording the multimedia conference, and a rejection option for indicating disagreement of recording the multimedia conference. The preset user with the authority of initiating the recording instruction may perform a trigger operation on the above-mentioned approval option. Here, performing the trigger operation on the above-mentioned approval option may be regarded as the above-mentioned preset operation performed according to the recording request.

Furthermore, the receiving a preset operation for instructing to record the multimedia conference includes: displaying a recording instruction initiating control on the client of the preset user with the authority of initiating the recording instruction.

The above-mentioned preset operation may be, for example, text information or voice information inputted in a display interface of the multimedia client to instruct to record the multimedia conference. In addition, the above-mentioned preset operation may further include a selection operation which is displayed on the display interface of the above-mentioned multimedia conference client and which is performed by the recording instruction initiating control for instructing to record the multimedia conference.

A user with a conference recording authority here may be determined in advance, or may be temporarily designated. As an example, the user with the conference recording authority may be the host of the multimedia conference. Alternatively, the user with the conference recording authority may be the conference participant user designated by the host of the multimedia conference.

In practice, the above-mentioned receiving a preset operation for instructing to record the multimedia conference includes: sending a recording request to the server; displaying a recording instruction initiating control based on display information sent by the server, where the display information is generated by the server based on the received recording request; and receiving a trigger operation performed by a preset user on the recording instruction initiating control.

That is, the preset user may send the above recording request to the server through the multimedia conference client used by the preset user. The server may determine, based on identity information of the preset user carried in the recording request sent by the multimedia conference client, whether the preset user has the authority of initiating the recording instruction. If it is determined that the preset user has the authority of initiating the recording instruction, display information, for instructing the multimedia conference client to display the recording instruction initiating control, is sent to the multimedia conference client of the preset user. The display information here may be, for example, preset information. The display information may include symbols, numbers and/or letters.

The multimedia conference client of the preset user may display the recording instruction initiating control based on the received display information.

The above preset user may perform a trigger operation on the above recording instruction initiating control. The above trigger operation may include, for example, a click operation, a touch operation, and the like. The multimedia conference client may send the recording instruction for recording the multimedia conference to the server based on the touch operation.

In some optional implementations, before step 102, the data processing method for a multimedia conference may further include: displaying a recording instruction initiating control on a client of conference participant user with an authority of initiating the recording instruction, to receive the recording instruction.

In these application scenarios, the above-mentioned recording instruction initiating control is displayed on the conference participant user client (here, the conference participant user client refers to the multimedia conference client of the conference participant user), so as to facilitate the user to send the above recording instruction to the server. The server here may be a server for recording a data stream of the multimedia conference. It may be a server responsible for data transmission of the multimedia conference.

Furthermore, optionally, the above-mentioned displaying a recording instruction initiating control on a client of conference participant user with an authority of initiating the recording instruction, to receive the recording instruction may include: displaying, in response to receiving a recording request sent by at least one conference participant user, the recording instruction initiating control on the conference participant user client with the authority of initiating the recording instruction, to receive the recording instruction.

The conference participant user may send a recording request. The recording instruction initiating control may be displayed to the conference participant user client with the authority of initiating the recording instruction based on the recording request sent by the conference participant user, so that the conference participant user with the authority of initiating the recording instruction sends the recording instruction to the server based on the recording instruction initiating control.

In these optional implementations, it is possible to ensure that the storage data of the multimedia conference is generated.

In some optional implementations, the electronic device executing the data processing method for a multimedia conference may perform step 102 by performing following steps 1 and step 2.

Step 1, the electronic device executing the data processing method for a multimedia conference may determine, in response to receiving the recording instruction for the multimedia conference, whether a user initiating the recording instruction is a conference participant user with a conference recording authority.

Step 2, the electronic device executing the data processing method for a multimedia conference may generate, in response to determining that the user initiating the recording instruction is the conference participant user with the conference recording authority, the storage data of the multimedia conference based on the multimedia data stream sent by the conference participant user.

The user with the conference recording authority here may be determined in advance, or may be temporarily designated. As an example, the user with the conference recording authority may be the host of the multimedia conference. Alternatively, the user with the conference recording authority may be the conference participant user designated by the host of the multimedia conference.

When the conference participant user sending the recording instruction has the conference recording authority, the storage data of the multimedia conference is generated based on the multimedia data stream sent by the conference participant user. In this way, the multimedia conference is recorded by the conference participant user with the conference recording authority, so as to ensure a security of content of the multimedia conference.

Furthermore, optionally, the above-mentioned data processing method also includes step 3, the electronic device executing the data processing method for a multimedia conference may send, in response to determining that the user initiating the recording instruction is not the conference participant user with the conference recording authority, recording prompt information to the conference participant user with the conference recording authority.

The order of performing step 2 and step 3 is not limited here.

When the conference participant user sending the recording instruction does not have the conference recording authority, the prompt information may be sent to the conference participant user with the conference recording authority.

In these optional implementations, other conference participant users send the prompt information to the conference participant user with the conference recording authority, so as to ensure that the storage data of the multimedia conference is generated.

In some optional implementations, the recording prompt information may include: an entry for sending the recording instruction to the multimedia conference server.

Here, the recording instruction may be used to instruct the multimedia conference server to generate the storage data of the multimedia conference.

The entry here may be, for example, an option which is arranged on a display interface for displaying the above-mentioned prompt information and which is used to represent sending the recording instruction to the multimedia conference server.

When the recording prompt information includes an entry for sending the recording instruction, the conference participant user with the conference recording authority may send the recording instruction to the multimedia conference server according to the entry, thereby saving the time that the conference participant user with the conference recording authority sends the recording instruction to the multimedia conference server.

Furthermore, the electronic device executing the data processing method for a multimedia conference may perform step 102 by:

generating the storage data of the multimedia conference based on multimedia data stream sent by a conference participant user who agrees to generate the storage data of the multimedia conference.

When the multimedia conference server receives the recording instruction, the multimedia conference server may send inquiry information (the inquiry information here may be a recording request sent by the server), about whether to agree to generate the storage data of the multimedia conference, to multiple conference participant users. Multiple conference participant users may reply information expressing agreement or information expressing disagreement for the inquiry information. After receiving the information expressing agreement sent by at least one conference participant user, the storage data of the multimedia conference is generated based on the multimedia data stream sent by the conference participant user who agrees to generate the storage data of the multimedia conference.

That is, the storage data, corresponding to the multimedia data stream sent by the conference participant user who agrees to generate the storage data of the multimedia conference, may be generated.

Therefore, the multimedia conference is recorded on the premise that the conference participant user agrees to the record, which further ensures the security of multimedia conference information.

In some optional implementations, the electronic device executing the data processing method for a multimedia conference may generate the storage data of the multimedia conference by perform following step 1 and step 2.

Step 1, the electronic device executing the data processing method for a multimedia conference may determine whether all the conference participant users currently agree to generate the storage data of the multimedia conference.

Step 2, the electronic device executing the data processing method for a multimedia conference may, in response to determining that all the conference participant users currently agree to generate the storage data of the multimedia conference, generate the storage data of the multimedia conference based on multimedia data streams sent by all the conference participant users.

The number of conference participant users in the multimedia conference may be two or more. In these optional implementations, the storage data of the multimedia conference may be generated only when all the conference participant users agree to record the multimedia conference. A risk of the content of the multimedia conference being leaked can be further reduced.

In some optional implementations, the electronic device executing the data processing method for a multimedia conference may perform step 102 in the following manner.

Specifically, the electronic device executing the data processing method for a multimedia conference may generate the storage data of the multimedia conference based on audio data streams sent by at least partial users, a video data stream of a target conference participant user of the conference participant user and/or current screen sharing information data of the conference participant user of the multimedia conference.

In some application scenarios, the electronic device executing the data processing method for a multimedia conference may generate the storage data of the multimedia conference based on the audio data streams sent by at least some users.

In these application scenarios, the electronic device may combine the audio data streams sent by at least some users, to combine multiple audio data streams into one audio data stream. The data corresponding to one audio data stream is used as the storage data.

It should be noted that various methods for combining the audio data streams are well-known technologies that are widely researched and applied at present, and are not repeated here.

In some application scenarios, the electronic device executing the data processing method for a multimedia conference may generate the storage data of the multimedia conference based on the video data stream of a target conference participant user of the conference participant user.

The above-mentioned target conference participant user include at least one of the conference participant user with the greatest volume among multiple conference participant users who make a statement, the conference participant user with the greatest accumulated audio energy in a preset time period including the current moment, and a user with a preset identity.

The user with the preset identity here may be the host of the multimedia conference, or may be the conference participant user designated in advance.

In addition, the target conference participant user may also be all the conference participant users.

In these application scenarios, the above-mentioned generating the storage data of the multimedia conference based on the video data stream of a target conference participant user of the conference participant user may include: combining the multimedia data streams of the conference participant users. For example, one video stream is selected from the video data streams of the conference participant users as the combined video data stream. For another example, at least two video data streams are selected from the video data streams of the conference participant users, and the at least two video data streams are processed into video data streams that can be displayed on the same display page (video mixing). Processing the at least two video data streams into video data streams that can be displayed on the same display page includes: setting a page display ratio, a display area or the like of each video data stream to be combined; combining the at least two video data streams, for which the page display ratio and the display area have been set, into a combined video data stream.

In some application scenarios, the electronic device executing the data processing method for a multimedia conference may generate the storage data of the multimedia conference based on audio data streams sent by at least some users, a video data stream of a target conference participant user and current screen sharing data stream of the conference participant user.

In these application scenarios, the screen sharing data of the conference participant user, for example, may be obtained by a first terminal device of the conference participant user who initiates the screen sharing recording all or part of content displayed on a screen of the first terminal device.

Correspondingly, when the above-mentioned storage data is generated, the screen sharing data stream and the video data stream of at least one conference participant user may be combined. For example, each frame of screen recording image corresponding to the screen sharing data stream is taken as the screen sharing data stream to be combined with the video data stream of at least one conference participant user. Alternatively, it is set a display parameter, such as a display ratio and a display area, of the screen recording image of the conference participant user who initiates the screen sharing; it is set a display parameter, such as a display ratio and a display area, of the video frame of the video data stream of at least one conference participant user; then the screen sharing data stream with the set display parameter and the video data stream of at least one conference participant user with the set display parameter are packaged into a video file to obtain a combined result.

The storage data of the multimedia conference, generated based on at least one of audio data stream, video data stream and screen sharing information data sent by the conference participant user, can save the audio information, video information and/or shared information of the multimedia conference. It is beneficial to restore the scene of the multimedia conference to the accessing user of the storage data, so that the accessing user can obtain as much information as possible.

In some optional implementations, the data processing method for a multimedia conference performed by a multimedia client may include: displaying, in response to the multimedia conference being in a recording state, prompt information indicating that the multimedia conference is in a recording state. In these optional implementations, when the multimedia conference server performs a data processing operation according to the recording instruction, the multimedia conference server may send recording feedback information indicating that the multimedia conference is in a recording state to the multimedia client. The multimedia client may determine that the multimedia conference is in the recording state based on the recording feedback information, and the prompt information indicating that the multimedia conference is in the recording state. The multimedia client here may be a multimedia client of a preset user with the authority of initiating the recording instruction, or may be a multimedia client of another conference participant user of the multimedia conference.

In some optional implementations, the electronic device executing the data processing method for a multimedia conference may perform the following steps.

Specifically, in response to determining that a recording duration of a current recording file corresponding to the storage data at a current moment exceeds a preset duration threshold and/or determining that a size of the current recording file exceeds a preset capacity threshold, the electronic device executing the data processing method for a multimedia conference may store partial storage data corresponding to the multimedia conference after the current moment in a next recording file.

In this way, the multimedia conference is recorded with restricting the recording duration of the multimedia conference and/or the size of the recording file, thereby reducing a cache resource requirement of the electronic device executing the data processing method for a multimedia conference.

Figure 2:
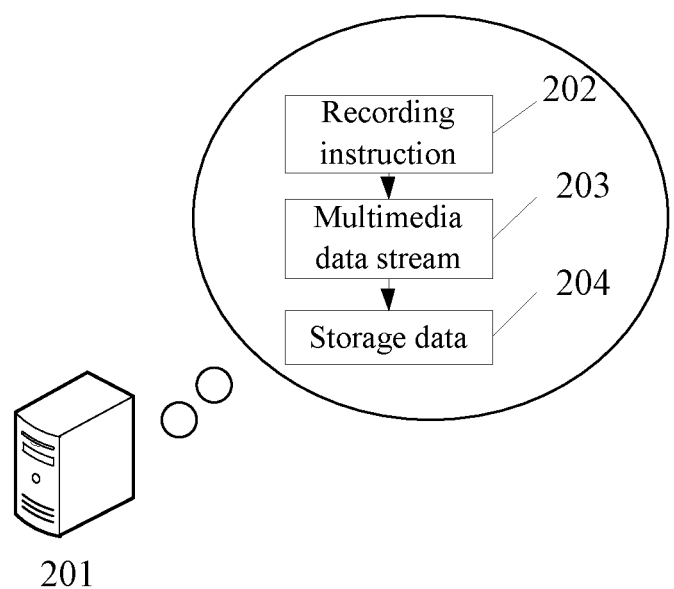
FIG. 2 is a schematic diagram of an application scenario of the data processing method for a multimedia conference according to the present disclosure.

Please refer to FIG. 2, FIG. 2 shows an application scenario of the data processing method for a multimedia conference according to an embodiment of the present disclosure. As shown in FIG. 2, a server 201 may receive a multimedia data stream 203 sent by a conference participant user of the multimedia conference. The server 201 may also receive a recording instruction 202 for the multimedia conference. Then, the server 201 may generate the storage data 204 of the multimedia conference according to the recording instruction 202 and based on the multimedia data stream 203 sent by the conference participant user. Furthermore, the server 201 may store the storage data 204 in cloud.

In this embodiment, the storage data is generated based on the multimedia data stream of the multimedia conference, and the storage data is stored in cloud, so that the user can access the storage data at any time, which provides convenience for the user to review the content of the multimedia conference. In addition, the storage resources of the terminal device can be saved. In addition, loss of the above-mentioned storage data caused by damage of the terminal device can also be avoided.

Figure 3:
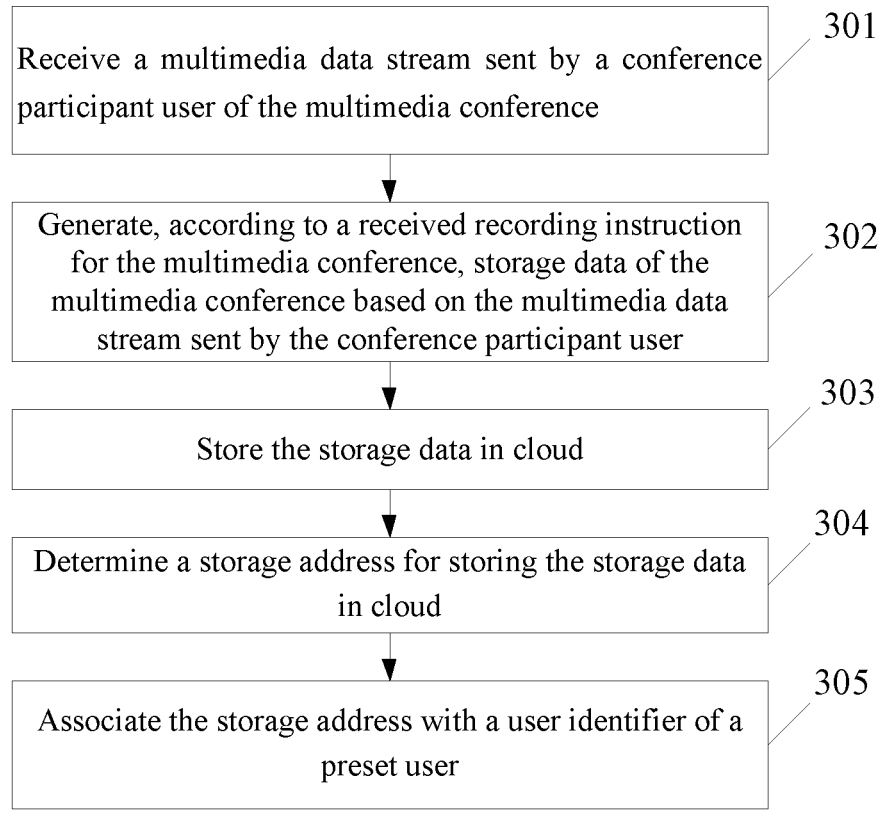
FIG. 3 is a flowchart of a data processing method for a multimedia conference according to another embodiment of the present disclosure.

Reference is made to FIG. 3, which is a flowchart of a data processing method for a multimedia conference according to another embodiment of the present disclosure. As shown in FIG. 3, the method includes steps 301 to 305.

Step 301, receive a multimedia data stream sent by a conference participant user of the multimedia conference.

Step 302, generate, according to a received recording instruction for the multimedia conference, storage data of the multimedia conference based on the multimedia data stream sent by the conference participant user.

Step 303, store the storage data in cloud.

The above steps 301, 302, and 303 may be performed in a similar manner to the steps 101, 102, and 103 in the embodiment shown in FIG. 1. The above description of steps 101, 102, and 103 also applies to steps 301, 302, and 303, and are not repeated here.

Step 304, determine a storage address for storing the storage data in cloud.

In this embodiment, after the generated storage data is stored in the cloud, the electronic device executing the data processing method for a multimedia conference may determine the storage address for storing the storage data in cloud. Here, the storage address may be an address of the storage data in cloud.

In some scenarios, the electronic device executing the data processing method for a multimedia conference may determine the storage address of the storage data in cloud based on a historical storage record. For example, the storage data of multiple multimedia conferences with the same conference theme may be stored in the same or similar storage addresses. Alternatively, the storage data of multiple multimedia conferences with the same host are stored in the same or similar storage addresses.

Step 305, associate the storage address with a user identifier of a preset user.

In some optional implementations, the above-mentioned preset user is a conference participant user who sends the recording instruction.

In some optional implementations, the above-mentioned preset user is a conference participant user with a preset identity.

In this embodiment, after determining the storage address of the storage data, the electronic device executing the data processing method for a multimedia conference may associate the storage address with a user identifier of a conference participant user who sends the recording instruction, or associate the storage address with a user identifier of a conference participant user with a preset identity. The storage data may be determined based on the user identifier of the preset user, which is helpful for searching the storage data.

In some optional implementations, the electronic device executing the data processing method for a multimedia conference may transmit address information indicating the storage address and storage data information of identification information corresponding to the storage data to an accessing user of the storage data.

The above-mentioned identification information may be information for identifying the storage data. The identification information may include theme information corresponding to the multimedia conference.

The above-mentioned storage data information may include address information indicating the storage addresses and identification information.

The aforementioned accessing user may be a user who requests to access the storage data.

When the accessing user requests to access the storage data, the storage data information may be returned to the accessing user. Thus, the accessing user may obtain the storage data stored in cloud based on the storage data information. The accessing user may obtain content of the multimedia conference recorded by the storage data.

In some optional implementations, the accessing user may include one of a conference participant user with a preset identity, one or more conference participant users, and a user with an authority of obtaining the storage data other than the conference participant user of the multimedia conference.

As an example, the conference participant user with the preset identity may be the moderator of the multimedia conference. The above-mentioned one or more conference participant users may be conference participant users of the multimedia conference. As an example, the above-mentioned one or more conference participant users may be ordinary conference participant users of the multimedia conference.

In some optional implementations, before transmitting the storage data information to an accessing user of the storage data, the electronic device executing the data processing method for a multimedia conference may grant an authority of accessing the storage address to the accessing user. Thus, by granting the access authority to the accessing user, a acquisition scope of the storage data can be restricted.

In some optional implementations, the data processing method for a multimedia conference performed by the multimedia client may further include: receiving and displaying storage data information sent by the multimedia conference server. The storage data information includes address information indicating a storage address to which the storage data is stored and/or identification information corresponding to the storage data. The identification information corresponding to the storage data includes theme information corresponding to the multimedia conference.

In these optional implementations, a user who uses the multimedia client may be the accessing user. The above-mentioned multimedia client displays the above-mentioned storage data information, so that the accessing user can intuitively understand the above-mentioned storage data information, which is beneficial to improve a speed at which the above-mentioned accessing user obtains the storage data.

Figure 4:
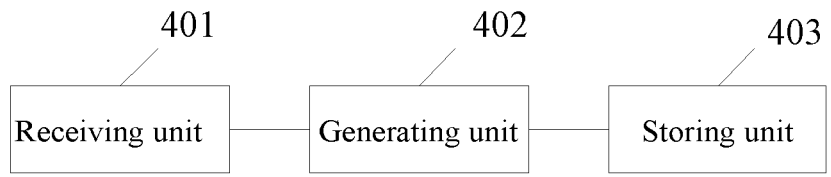
FIG. 4 is a schematic structural diagram of a data processing apparatus for a multimedia conference according to an embodiment of the present disclosure.

Reference is made to FIG. 4, as an implementation of the methods described above, the present disclosure provides an embodiment of a data processing apparatus for a multimedia conference, the apparatus embodiment corresponds to the display method embodiment shown in FIG. 1, and the apparatus may specifically be used in various electronic devices.

As shown in FIG. 4, the data processing apparatus for a multimedia conference according to the embodiment includes: a receiving unit 401, a generating unit 402 and a storing unit 403. The receiving unit 401 is configured to receive a multimedia data stream sent by a conference participant user of the multimedia conference. The generating unit 402 is configured to generate, according to a received recording instruction for the multimedia conference, storage data of the multimedia conference based on the multimedia data stream sent by the conference participant user. The storing unit 403 is configured to store the storage data in cloud.

In this embodiment, the specific processing of the receiving unit 401, the generating unit 402 and the storing unit 403 of the data processing apparatus for a multimedia conference and the technical effects brought by the units may refer to the relevant descriptions of steps 101, 102 and 103 in the corresponding embodiment of FIG. 1 respectively, which will is not repeated here.

In some optional implementations, the above-mentioned data processing apparatus for a multimedia conference may further include an associating unit (not shown in the drawing) configured to: determine a storage address for storing the storage data in cloud; and associate the storage address with a user identifier of a conference participant user sending the recording instruction.

In some optional implementations, the above-mentioned data processing apparatus for a multimedia conference may further include a transmitting unit (not shown in the drawing) configured to: transmit address information indicating the storage address and storage data information of identification information corresponding to the storage data to an accessing user of the storage data. The identification information corresponding to the storage data includes theme information corresponding to the multimedia conference.

In some optional implementations, the accessing user includes one of a conference participant user with a preset identity, one or more conference participant users, and a user with an authority of obtaining the storage data other than the conference participant user of the multimedia conference.

In some optional implementations, the above-mentioned data processing apparatus for a multimedia conference may further include a granting unit (not shown in the drawing) configured to: before the transmitting unit transmits the address information indicating the storage address and storage data information of identification information corresponding to the storage data to an accessing user of the storage data, grant an authority of accessing the storage address to the accessing user.

In some optional implementations, the generating unit 402 is further configured to: determine, in response to receiving the recording instruction for the multimedia conference, whether a user initiating the recording instruction is a conference participant user with a conference recording authority; and generate, in response to determining that the user initiating the recording instruction is the conference participant user with the conference recording authority, the storage data of the multimedia conference based on the multimedia data stream sent by the conference participant user.

In some optional implementations, the above-mentioned data processing apparatus for a multimedia conference may further include a sending unit (not shown in the drawing) configured to: send, in response to determining that the user initiating the recording instruction is not the conference participant user with the conference recording authority, recording prompt information to the conference participant user with the conference recording authority.

In some optional implementations, the recording prompt information may include: an entry for sending the recording instruction to the multimedia conference server. Here, the recording instruction may be used to instruct the multimedia conference server to generate the storage data of the multimedia conference.

In some optional implementations, the above-mentioned data processing apparatus for a multimedia conference may further include a displaying unit (not shown in the drawing) configured to: before the generating unit generates, according to a received recording instruction for the multimedia conference, storage data of the multimedia conference based on the multimedia data stream sent by the conference participant user, display a recording instruction initiating control on a conference participant user client with an authority of initiating the recording instruction, to receive the recording instruction.

In some optional implementations, the displaying unit is further configured to: display, in response to receiving a recording request sent by at least one conference participant user, the recording instruction initiating control on the conference participant user client with the authority of initiating the recording instruction, to receive the recording instruction.

In some optional implementations, the generating unit 402 is further configured to: generate the storage data of the multimedia conference based on multimedia data stream sent by a conference participant user who agrees to generate the storage data of the multimedia conference.

In some optional implementations, the generating unit 402 is further configured to: generate, in response to a received ratio, of the conference participant users who send agreeing record feedback information to all the conference participant users, exceeds a preset ratio, the storage data of the multimedia conference based on multimedia data streams sent by the conference participant users.

In some optional implementations, the generating unit 402 is further configured to: generate the storage data of the multimedia conference based on audio data streams sent by at least partial users, audio data streams of at least partial conference participant users, a video data stream of a target conference participant user of the conference participant user and/or current screen sharing information data of the conference participant user of the multimedia conference.

In some optional implementations, the above-mentioned data processing apparatus for a multimedia conference may further include a storing unit (not shown in the drawing) configured to: store, in response to determining that a recording duration of a current recording file corresponding to the storage data at a current moment exceeds a preset duration threshold and/or determining that a size of the current recording file exceeds a preset capacity threshold, partial storage data corresponding to the multimedia conference after the current moment in a next recording file.

In addition, the present disclosure also provides an embodiment of a data processing apparatus for a multimedia conference, the apparatus may specifically be used in various electronic devices.

The data processing apparatus for a multimedia conference includes: an operation receiving unit configured to receive a preset operation for instructing to record the multimedia conference; and a sending unit configured to send a recording instruction for the multimedia conference to a multimedia conference server based on the preset operation, where the server performs following data processing operations: generating storage data of the multimedia conference according to the received recording instruction; and storing the storage data in cloud.

In some optional implementations, the operation receiving unit is further configured to: performing the preset operation in response to receiving a recording request sent by a conference participant user.

In some optional implementations, the client is a client of a preset user with an authority of initiating the recording instruction, and the operation receiving unit is further configured to: display a recording instruction initiating control on the client of the preset user with the authority of initiating the recording instruction.

In some optional implementations, the operation receiving unit is further configured to: send a recording request to the server; display a recording instruction initiating control based on display information sent by the server, where the display information is generated by the server based on the received recording request; and receive a trigger operation performed by a preset user on the recording instruction initiating control.

In some optional implementations, the data processing operations performed by the server include: generating, according to the received recording instruction for the multimedia conference, the storage data of the multimedia conference based on multimedia data stream sent by a conference participant user who agrees to generate the storage data of the multimedia conference.

In some optional implementations, the above-mentioned data processing apparatus for a multimedia conference may further include a storage data receiving unit configured to: receive storage data information sent by the server, where the storage data information includes address information indicating a storage address to which the storage data is stored and/or identification information corresponding to the storage data.

In some optional implementations, the above-mentioned data processing apparatus for a multimedia conference may further include a displaying unit configured to: display, in response to the multimedia conference being in a recording state, prompt information indicating that the multimedia conference is in the recording state.

Figure 5:
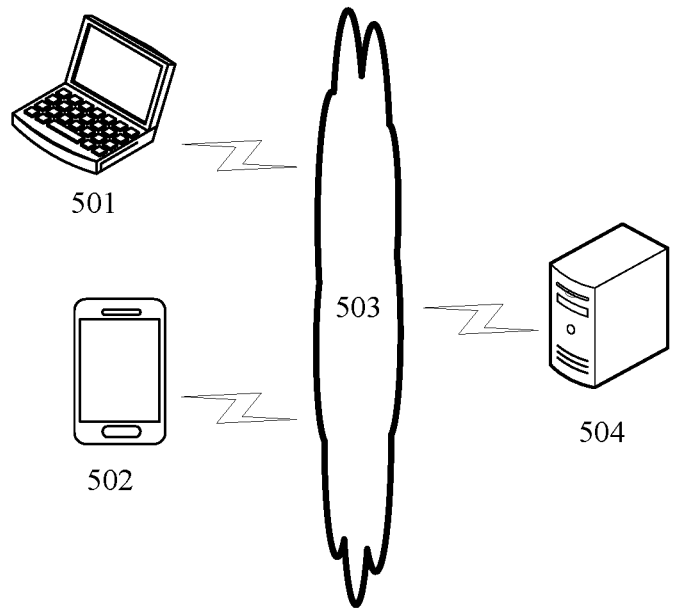
FIG. 5 is an exemplary system architecture to which a data processing method for a multimedia conference according to an embodiment of the present disclosure may be applied.

Reference is made to FIG. 5, which is an exemplary system architecture to which a data processing method for a multimedia conference according to an embodiment of the present disclosure may be applied.

As shown in FIG. 5, the system architecture may include terminal devices 501 and 502, a network 503, and a server 504. The network 503 is a medium used to provide a communication link between the terminal devices 501, 502 and the server 504. The network 503 may include various connection types, such as wired, wireless communication links, or fiber optic cables.

The terminal devices 501, 502 may interact with the server 504 through the network 503 to receive or send messages and the like. Various client applications, such as multimedia conference applications, web browser applications, and search applications, may be installed on the terminal devices 501, 502. The client applications in the terminal devices 501, 502 may send a multimedia data stream to the server 504.

The terminal devices 501, 502 may be hardware or software. When the terminal devices 501, 502 are hardware, they may be various electronic devices that have a display screen and support web browsing, including but not limited to smart phones, tablet computers, laptops and desktops, etc. When the terminal devices 501, 502 are software, they may be installed in the electronic devices listed above. They may be implemented as multiple software or software modules or may be implemented as a single software or software module, which is not limited here.

The server 504 may be a server that can provide various services. For example, the server 504 may generate storage data of the multimedia conference based on multimedia data streams sent by terminals 501 and 502. For example, the server 504 may store the generated storage data in the cloud.

The server 504 may receive information acquiring requests sent by terminal devices 501, 502, acquiring display information corresponding to the information acquiring requests in various manners according to the information acquiring requests.

The server 504 may be hardware or software. When the server 504 is hardware, it may be implemented as a distributed server cluster composed of multiple servers, or may be implemented as a single server. When the server 504 is software, it may be implemented as multiple software or software modules (e.g., multiple software or software modules for providing distributed services), or may be implemented as a single software or software module. There is no specific limitation here.

It should be noted that the data processing method for a multimedia conference provided by the embodiments of the present disclosure may be executed by the server 504, and correspondingly, the data processing apparatus for a multimedia conference may be arranged in the server 504.

It should be understood that the numbers of terminal devices, networks and servers in FIG. 5 are merely illustrative. There may be any number of terminal devices, networks and servers according to implementation needs.

Figure 6:
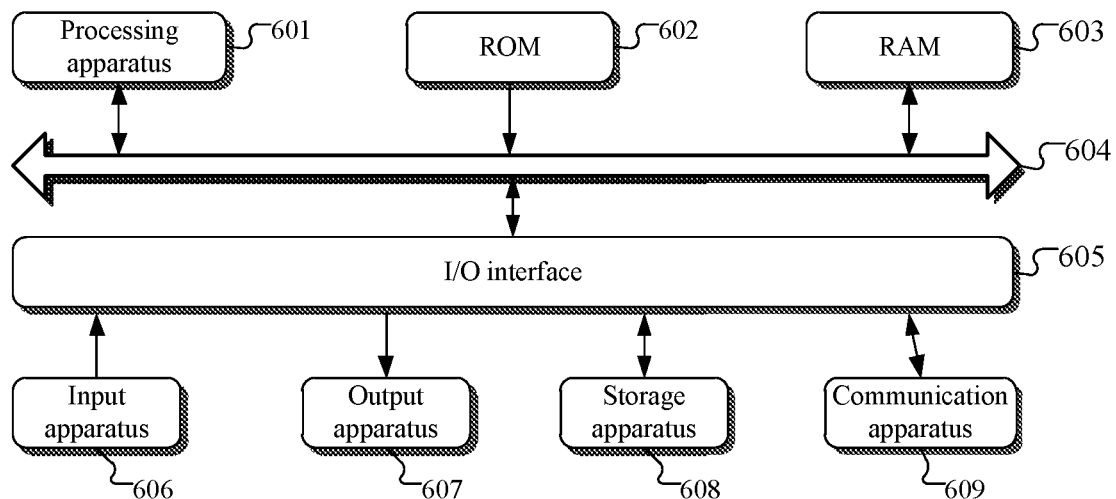
FIG. 6 a schematic diagram of a basic structure of an electronic device according to an embodiment of the present disclosure.

Reference is made to FIG. 6 which shows a schematic structural diagram of an electronic device (such as servers in FIG. 5) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 6 is schematic, and is not intended to limit functions and scope of the embodiments of the present disclosure.

As shown in FIG. 6, the electronic device may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device 600 are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input apparatus 606 such as a touch screen, a touch panel, a keyboard, a mouse, a camera, a microphone, an accelerometer, and gyroscope; an output apparatus 607 such as a liquid crystal display (LCD), a loudspeaker and a vibrator; a storage apparatus 608 such as a magnetic tape and a hard disk; and a communication apparatus 609. The communication apparatus 609 may allow the electronic device to communicate with other device in a wired or wireless manner to exchange data. Although FIG. 6 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. The one or more programs, when executed by the electronic device, cause the electronic device to: receive a multimedia data stream sent by a conference participant user of the multimedia conference; generate, according to a received recording instruction for the multimedia conference, storage data of the multimedia conference based on the multimedia data stream sent by the conference participant user; and store the storage data in cloud.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the receiving unit may also be described as "a unit for receiving a multimedia data stream sent by a conference participant user of the multimedia conference".

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A data processing method for a multimedia conference, comprising:
    receiving a multimedia data stream sent by a conference participant user of the multimedia conference;
    generating, according to a received recording instruction for the multimedia conference, storage data of the multimedia conference based on the multimedia data stream sent by the conference participant user, wherein the generating, according to a received recording instruction for the multimedia conference, storage data of the multimedia conference based on the multimedia data stream sent by the conference participant user further comprises:
        determining, in response to receiving the recording instruction for the multimedia conference, whether a user initiating the recording instruction is a conference participant user with a conference recording authority, and
        generating, in response to determining that the user initiating the recording instruction is the conference participant user with the conference recording authority, the storage data of the multimedia conference based on the multimedia data stream sent by the conference participant user;
    storing the storage data in cloud; and
    wherein the data processing method further comprises sending, in response to determining that the user initiating the recording instruction is not the conference participant user with the conference recording authority, recording prompt information to the conference participant user with the conference recording authority.

2. The method according to claim 1, further comprising:
    determining a storage address for storing the storage data in cloud; and
    associating the storage address with a user identifier of a preset user.

3. The method according to claim 2, wherein the preset user is a conference participant user who sends the recording instruction; or
    the preset user is a conference participant user with a preset identity.

4. The method according to claim 2, further comprising:
    transmitting address information indicating the storage address and storage data information of identification information corresponding to the storage data to an accessing user of the storage data.

5. The method according to claim 4, wherein the accessing user comprises one of a conference participant user with a preset identity, one or more conference participant users, and a user with an authority of obtaining the storage data other than the conference participant user of the multimedia conference.

6. The method according to claim 5, wherein before transmitting the address information indicating the storage address and storage data information of identification information corresponding to the storage data to an accessing user of the storage data, the method further comprises:
    granting an authority of accessing the storage address to the accessing user.

7. The method according to claim 1, wherein before the generating, according to a received recording instruction for the multimedia conference, storage data of the multimedia conference based on the multimedia data stream sent by the conference participant user, the method further comprises:
    displaying a recording instruction initiating control on a client of a conference participant user with an authority of initiating the recording instruction, to receive the recording instruction.

8. The method according to claim 7, wherein the displaying a recording instruction initiating control on a conference participant user client with an authority of initiating the recording instruction, to receive the recording instruction comprises:
    displaying, in response to receiving a recording request sent by at least one conference participant user, the recording instruction initiating control on the client of the conference participant user with the authority of initiating the recording instruction, to receive the recording instruction.

9. The method according to claim 1, wherein the generating, according to a received recording instruction for the multimedia conference, storage data of the multimedia conference based on the multimedia data stream sent by the conference participant user comprises:
    generating the storage data of the multimedia conference based on multimedia data stream sent by a conference participant user who agrees to generate the storage data of the multimedia conference.

10. The method according to claim 9, wherein the generating the storage data of the multimedia conference based on multimedia data stream sent by a conference participant user who agrees to generate the storage data of the multimedia conference comprises:
    generating, in response to a received ratio, of the conference participant users who send agreeing record feedback information to all the conference participant users, exceeds a preset ratio, the storage data of the multimedia conference based on multimedia data streams sent by the conference participant users.

11. The method according to claim 1, wherein the generating storage data of the multimedia conference based on the multimedia data stream sent by the conference participant user comprises:
generating the storage data of the multimedia conference based on a video data stream of a target conference participant user of the conference participant user and/or current screen sharing information data of the conference participant user of the multimedia conference.

12. The method according to claim 1, further comprising:
storing, in response to determining that a recording duration of a current recording file corresponding to the storage data at a current moment exceeds a preset duration threshold and/or determining that a size of the current recording file exceeds a preset capacity threshold, partial storage data corresponding to the multimedia conference after the current moment in a next recording file.

13. A data processing method for a multimedia conference, applied to a client, the method comprising:
receiving a preset operation for instructing to record the multimedia conference, wherein the receiving a preset operation for instructing to record the multimedia conference comprises:
sending a recording request to the server,
displaying a recording instruction initiating control based on display information sent by the server, wherein the display information is generated by the server based on the received recording request, and
receiving a trigger operation performed by a preset user on the recording instruction initiating control; and
sending a recording instruction for the multimedia conference to a multimedia conference server based on the preset operation, wherein the server performs following data processing operations: generating storage data of the multimedia conference according to the received recording instruction and based on a multimedia data stream sent by a conference participant user; and storing the storage data in cloud.

14. The method according to claim 13, wherein the preset operation is performed in response to receiving a recording request sent by a conference participant user.

15. The method according to claim 13, wherein the client is a client of a preset user with an authority of initiating the recording instruction, and the receiving a preset operation for instructing to record the multimedia conference comprises:
displaying a recording instruction initiating control on the client of the preset user with the authority of initiating the recording instruction.

16. The method according to claim 13, further comprising:
receiving storage data information sent by the server, wherein
the storage data information comprises address information indicating a storage address to which the storage data is stored and/or identification information corresponding to the storage data.

17. The method according to claim 13, further comprising:
displaying, in response to the multimedia conference being in a recording state, prompt information indicating that the multimedia conference is in a recording state.

18. A data processing apparatus for a multimedia conference, comprising: one or more processors; and a memory configured to store one or more programs;
wherein when the one or more programs are executed by the one or more processors, the one or more processors are caused to perform operations comprising:
receiving a multimedia data stream sent by a conference participant user of the multimedia conference,
generating, according to a received recording instruction for the multimedia conference, storage data of the multimedia conference based on the multimedia data stream sent by the conference participant user, wherein the generating, according to a received recording instruction for the multimedia conference, storage data of the multimedia conference based on the multimedia data stream sent by the conference participant user further comprises:
determining, in response to receiving the recording instruction for the multimedia conference, whether a user initiating the recording instruction is a conference participant user with a conference recording authority, and
generating, in response to determining that the user initiating the recording instruction is the conference participant user with the conference recording authority, the storage data of the multimedia conference based on the multimedia data stream sent by the conference participant user,
storing the storage data in cloud, and
the operations further comprise sending, in response to determining that the user initiating the recording instruction is not the conference participant user with the conference recording authority, recording prompt information to the conference participant user with the conference recording authority; or
wherein when the one or more programs are executed by the one or more processors, the one or more processors are caused to perform operations comprising:
receiving a preset operation for instructing to record the multimedia conference, wherein the receiving a preset operation for instructing to record the multimedia conference comprises:
sending a recording request to the server,
displaying a recording instruction initiating control based on display information sent by the server, wherein the display information is generated by the server based on the received recording request, and
receiving a trigger operation performed by a preset user on the recording instruction initiating control, and
sending a recording instruction for the multimedia conference to a multimedia conference server based on the preset operation, wherein the server performs following data processing operations: generating storage data of the multimedia conference according to the received recording instruction and based on a multimedia data stream sent by a conference participant user; and storing the storage data in cloud.

19. A non-transitory computer readable medium storing computer programs,
wherein the programs are executed by a processor to perform operations comprising:
receiving a multimedia data stream sent by a conference participant user of the multimedia conference,
generating, according to a received recording instruction for the multimedia conference, storage data of the multimedia conference based on the multimedia data stream sent by the conference participant user, wherein the generating, according to a received recording instruction for the multimedia conference, storage data of the multimedia conference based on the multimedia data stream sent by the conference participant user further comprises:
  determining, in response to receiving the recording instruction for the multimedia conference, whether a user initiating the recording instruction is a conference participant user with a conference recording authority, and
  generating, in response to determining that the user initiating the recording instruction is the conference participant user with the conference recording authority, the storage data of the multimedia conference based on the multimedia data stream sent by the conference participant user,
storing the storage data in cloud, and
the operations further comprise sending, in response to determining that the user initiating the recording instruction is not the conference participant user with the conference recording authority, recording prompt information to the conference participant user with the conference recording authority; or wherein the programs are executed by a processor to perform operations comprising:
receiving a preset operation for instructing to record the multimedia conference, wherein the receiving a preset operation for instructing to record the multimedia conference comprises:
  sending a recording request to the server,
  displaying a recording instruction initiating control based on display information sent by the server, wherein the display information is generated by the server based on the received recording request, and
  receiving a trigger operation performed by a preset user on the recording instruction initiating control, and
sending a recording instruction for the multimedia conference to a multimedia conference server based on the preset operation, wherein the server performs following data processing operations: generating storage data of the multimedia conference according to the received recording instruction and based on a multimedia data stream sent by a conference participant user; and storing the storage data in cloud.

\* \* \* \* \*